Sept. 7, 1943.                R. PLACE                2,328,847
                              CAMERA
                        Filed Sept. 26, 1940
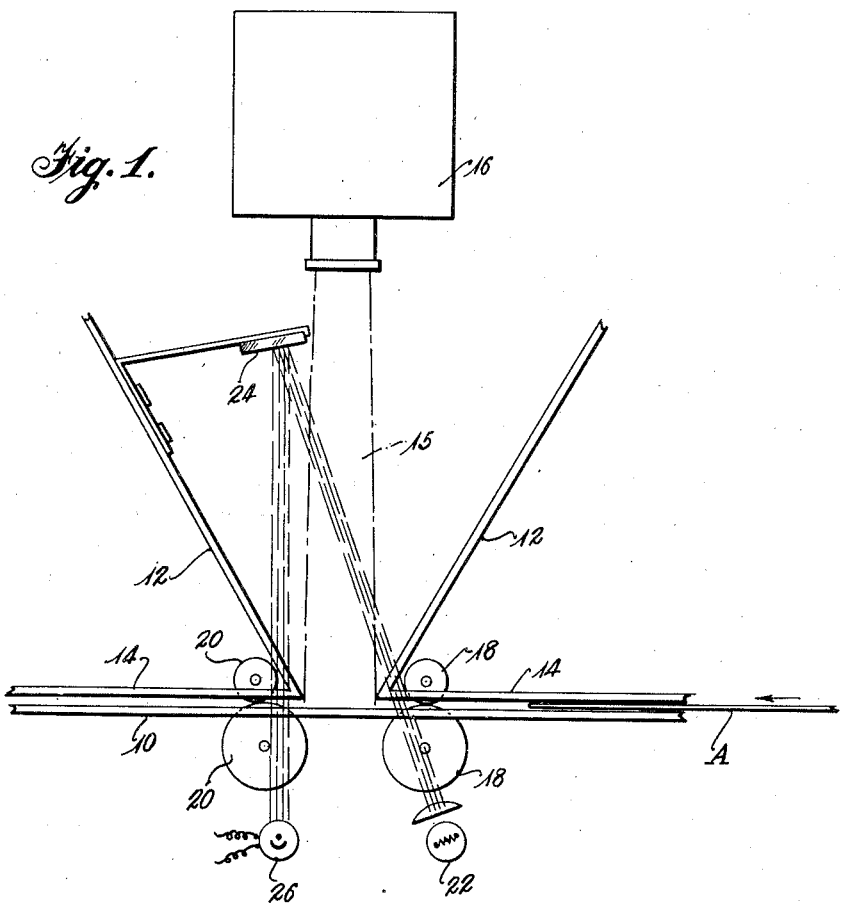
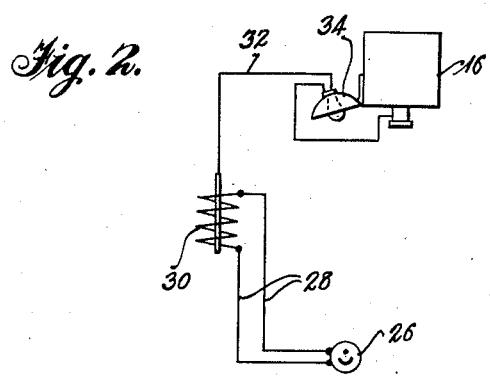
Inventor
*Robert Place*
By
Attorney Patented Sept. 7, 1943

2,328,847

UNITED STATES PATENT OFFICE 2,328,847

CAMERA

Robert Place, Waltham, Mass., assignor to Graphic Microfilm Service, Inc., Waltham, Mass., a corporation of Massachusetts Application September 26, 1940, Serial No. 358,542

6 Claims. (Cl. 88—24)

This invention relates to improvements in cameras and particularly machines for photographing documents on microfilm or the like.

It is an object of the invention to provide a device for photographing documents of various kinds and sizes without the necessity of adjustment for each particular document size and which is adapted to photograph, for example, bank checks of any conventional size on the one hand and, on the other, to provide a continuous photograph of elongated drawings without a break, the length of the drawing being restricted only by the amount of film in the camera.

A further object is to provide improvements in document photographing machines utilizing a photo-electric cell in circuit with an electrically controlled camera actuating mechanism and, more particularly, to provide a plurality of light beams across the path of documents fed to the machine, one beam at the approach end of the photographic field of the camera and another at the exit end, the photo-electric cell being positioned so that it is darkened by the interception by a document of either beam.

Other objects and advantages of the invention will be apparent from the following detailed explanation taken in conjunction with the accompanying drawing.

In the drawing:

Fig. 1 is a side elevational view in fragment of a device showing the working parts of my invention incorporated therein; and Fig. 2 is a schematic view of the device of Fig. 1 showing the photo-electric cell in circuit with the camera actuating mechanism.

Referring more particularly to the drawing, a bed plate is represented at 10 and walls 12 having a portion 14 extending substantially parallel to the plate 10 are arranged to bound the photographic field indicated in dotted lines 15 of a camera 16 of the continuous or panoramic type at the approach and exit points in the path of documents conveyed through the device, the documents or other subjects to be photographed being introduced as indicated at D in Fig. 1.

Rollers 18 are arranged to project through slots in the bed 10 and plate portion 14 to receive the document or other matter D and are driven in a manner to convey the same across the photographic field 15 whereupon the document is picked up by rollers 20 and withdrawn from the field and discharged from the machine.

A source of light 22 projects a beam of light to intersect the bed at the side of the photographic field approached by the document conveyed through the machine, apertures being provided in the walls 12 for permitting passage of this beam, and the light beam is directed upon a reflecting surface such as a mirror 24 carried by a bracket attached to one of the walls 12 and positioned to one side of the photographic field. From mirror 24 the light beam is reflected downwardly through suitable apertures in the wall 12 and the bed 10 at the exit side of the photographic field onto a photo-electric cell 26.

The photo-electric cell 26 is connected by conductors 28 to a solenoid 30 which in turn is connected by a conductor 32 to a source of light 34 for the film exposure during actuation of the camera, the solenoid being arranged to simultaneously actuate the light source 34 and the film advance and shutter mechanism of the camera 16. Such actuating means is well known in the art and hence is not illustrated, it being understood that the particular actuating mechanism forms no part of the present invention.

In the operation of the parts above described and of a device having the improvements of my invention embodied therewith, the documents, whether they be bank checks or blue prints several feet in length, are fed successively into the space between the bed 10 and plate portion 14 where they are engaged by the rollers 18 adjacent the approach side of the photographic field 15 and thence passed across the photographic field. As each document is moved into the photographic field by the rollers 18, the forward edge thereof intercepts the light beam projected from the light source 22 and darkens the photo-electric cell 26 which then closes the circuit through the solenoid 30 and conductors 28 and 32 to the photo light 34 and camera 16 to energize the light 34 and initiate the advance of the film in the camera to photograph the document as it passes across the photographic field.

After passing through the photographic field, the forward end of the document is picked up by the rollers 20 which then function to draw the remainder of the document across the field and finally discharge it from the machine. As the rearward end of the document leaves the rollers 18 and passes beyond the approach side of the photographic field, the beam of light projected from the light source 22 is no longer intercepted and is directed upon the mirror 24. As the rearward end of the document having passed across the photographic field and been photographed is drawn past the reflected light beam by the rollers 20, the reflected beam is directed onto the photo-electric cell 26 which then operates to open the circuit to the camera actuating mechanism and stop operation of the camera, whereupon the cycle is repeated.

What I claim is:

1. A machine for photographing documents and the like comprising, a camera and an electrically controlled actuating mechanism, means for conveying documents to be photographed across the photographic field of said camera, a source for a light beam intersecting the path of said documents at points adjacent its approach to and exit from said photographic field, a photoelectric cell positioned responsive to said light beam and in circuit with said camera actuating mechanism for operating said camera when a conveyed document intercepts the light beam at said approach point and for rendering said camera inoperative when said conveyed document passes the light beam at said exit point.

2. A machine for photographing documents comprising, a camera and an electrically controlled actuating mechanism, a bed positioned in the photographic field of said camera for supporting documents being photographed, means for conveying documents across said bed, a source for a light beam intersecting said bed at opposite sides of said photographic field and at successive points along the path of the conveyed documents, and a photo-electric cell positioned responsive to said light beam and in circuit with said actuating mechanism to operate said camera while a document on said bed intercepts the light beam at either of said opposed sides of the photographic field.

3. A machine for photographing documents comprising, a camera and an electrically controlled actuation mechanism, means for conveying documents to be photographed across the photographic field of said camera, a source of light projecting a light beam intersecting the path of said documents at one side of said photographic field, a photo-electric cell, and a reflector positioned to reflect the light beam from said source onto said photo-electric cell and to intersect said path at the opposite side of said photographic field, the said photo-electric cell being in circuit with said camera actuating mechanism to operate said camera while a conveyed document is intercepting either said projected or said reflected beam of light.

4. In a machine for photographing documents having a camera and electrically controlled actuating mechanism, means for conveying documents to be photographed across the photographic field of said camera and a photo-electric cell receiving a light beam intersecting the path of conveyed documents at its approach to the photographic field of said camera and in circuit with said camera actuating mechanism to close said circuit and actuate said camera when a conveyed document intercepts said light beam, the combination of means for directing a light beam to intersect said path at its exit from said photographic field and onto said photo-electric cell, said directed light beam causing the photo-electric cell to maintain the camera actuating circuit closed to continue actuation of said camera while the conveyed document is intercepting said directed beam of light.

5. In a machine for photographing documents having a camera and electrically controlled actuating mechanism, means for conveying documents to be photographed across the photographic field of said camera and a photo-electric cell receiving a light beam intersecting the path of conveyed documents at its approach to the photographic field of said camera and in circuit with said camera actuating mechanism to close said circuit and actuate said camera when a conveyed document intercepts said light beam, the combination of means for reflecting said light beam to intersect said path at its exit from said photographic field and onto said photoelectric cell, said reflected light beam causing the photo-electric cell to maintain the camera actuating circuit closed to continue actuation of said camera while the conveyed document is intercepting said reflected light beam.

6. A machine for photographing documents comprising a camera and electrically controlled actuating mechanism, a bed positioned in the photographic field of said camera for supporting documents being photographed, roller means at one end of said bed for conveying documents to be photographed onto said bed and roller means at the opposite end of said bed for withdrawing photographed documents from said bed, a source for a light beam intersecting said bed at opposite sides of said photographic field and at successive points along the path of the conveyed documents, and a photo-electric cell positioned responsive to said light beam and in circuit with said actuating mechanism to operate said camera while a document on said bed intercepts the light beam at either of said opposed sides of the photographic field.

ROBERT PLACE.